United States Patent Office 3,681,180
Patented Aug. 1, 1972

3,681,180
DECORATIVE PLASTICS STRIPS AND
EXTRUSIONS
Cecil Kent, Woking, England, assignor to Creators
Limited, Surrey, England
Filed July 28, 1969, Ser. No. 845,155
Int. Cl. B32b 3/04; B60r 19/00
U.S. Cl. 161—5                                        5 Claims

ABSTRACT OF THE DISCLOSURE

This invention relates to decorative plastics strips having a surface displaying a metallised finish. As described, the metallised surface of a strip of transparent or translucent polyester film is laminated to a thin backing layer of polyvinyl chloride, and a second strip of transparent or translucent polyvinyl chloride film, which is wider than the polyester strip, is laminated to the unmetallised surface of the polyester film with its marginal edge zones protruding beyond the edges of the polyester strip. The invention also relates to decorative plastics extrusions having bonded thereto such strips.

---

The present invention relates to decortaive plastics strips having a surface displaying a metallised finish. Such decorative strips may be used for providing a metallised finish on extrusions of plastics materials having suitable cross sectional shapes for use as edge trimmings on motor car bodies, as filler strips in rubber surrounds for motor car windscreens or other windows, and for other purposes for which, for example, chromium plated strips are being or have been used. The face of the strip displaying the metallised finish is herein referred to as the "front face."

British specification No. 857,814 describes a decorative plastics extrusion in which, for the purpose of protecting the metal layer from tarnishing or corroding, the metal layer is applied in close surface contact on the surface of a strip of transparent or translucent plastics film which is embedded in the extrusion with the plastics film facing the front face of the extrusion, whereby that surface of the metal layer which is applied against the film is seen through the front face of the extrusion, said plastics film having retained its film form and not having broken down under the heating to which it has been submitted during extrusion.

By applying the metal layer in close surface contact with the plastics film, the surface of the metal layer which is seen through the front face of the extrusion is protected from air or moisture, whereby tranishing or corrosion of this surface is reduced. The metal layer may be formed by spraying or vacuum-depositing a metal coating onto the surface of a plastics film, preferably a polyester film such as "Mylar" (registered trademark). The metal layer may be laminated between two strips of plastics film so that both surfaces of the metal layer are protected.

British specification No. 1,056,697 describes an improvement in which the metallised strip, comprising a metallised "Mylar" film having its metallised surface laminated to a thin layer of polyvinyl chloride (P.V.C.), has its P.V.C. layer bonded to the surface of an extruded core also made of P.V.C., and the core with the laminated metallised strip bonded thereto is incorporated as an insert in an extrusion of transparent or translucent plastics material, particularly crystal clear P.V.C., which forms a protective layer over the metallised film laminate which is seen through the front face of the transparent or translucent plastics extrusion. By means of this improved construction, the metallised strip is held rigidly at the desired shape by the core, and crinkling of the metal layer where the decorative extrusion is bent is reduced or eliminated.

Decorative plastic extrusions are also made in which a strip of metallised "Mylar" film, having its metallised surface bonded to a thin backing layer of P.V.C., is bonded to the outer surface of a plastics extrusion of a desired cross-section, for example as described in British specification No. 1,034,643. Such decorative extrusions, however, are unsuitable for external use as air and moisture can penetrate the metal layer along the longitudinal edges of such metallised strips which are made by slitting wide bands of th metallised film laminate. The metallised layer also tends to crinkle on sharp bends.

According to the present invention, a metallised strip particularly for making decorative plastics extrusions, comprises a strip of transparent or translucent polyester film, such as "Mylar," having one surface metallised, e.g. with aluminium, and having its metallised surface laminated to a thin backing layer of P.V.C., and a second strip of transparent or translucent P.V.C. film, which is wider than the polyester strip, laminated to the unmetallised surface of the polyester film with its marginal edges protruding beyond the edges of the polyester strip.

In order that the invention may be more clearly understood, reference will now be made to the accompanying drawing, in which.

Figure 1:
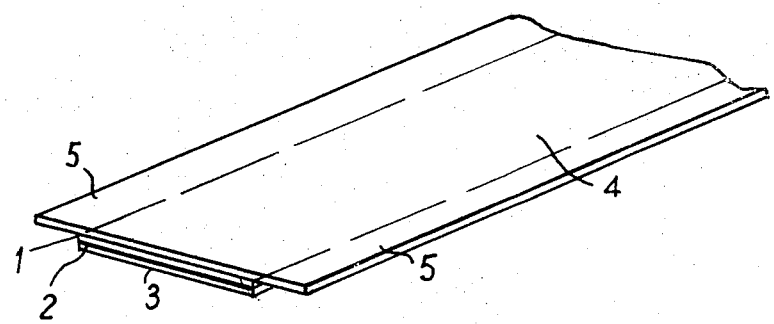
FIG. 1 shows a composite metallised strip according to the invention.

A metallised strip according to the invention is diagrammatically illustrated in FIG. 1 of the drawing, which is not to scale. 1 is the transparent polyester film which has a metallised layer 2 over which is laminated a P.V.C. backing layer 3 of the same width as the polyester film. 4 is the outer transparent P.V.C. film of which the marginal edges 5 protrude beyond the edges of the polyester strip 1.

Figure 2:
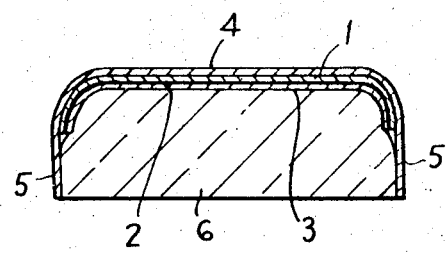
FIGS. 2 and 3 show sections of decorative extrusions embodying the metallised strip of FIG. 1.

Such a metallised strip according to the invention may, as shown in FIG. 2, be bonded to the surface of a P.V.C. extrusion 6 of any desired cross section, the protruding marginal zones 5 of the outer P.V.C. film also being bonded firmly to the extrusion. The outer P.V.C. film thus seals the longitudinal edges of the metallised layer and provides mechanical protection for the Mylar film in the same way as the extruded sheath of transparent P.V.C. provided by the construction according to Specification No. 1,056,-697, and without the necessity of a second extrusion operation. The bonding of the edges 5 of the outer P.V.C. film also presses the metallised polyester film towards the extrusion and assists in avoiding crinkling.

The composite metallised strip may be bonded to the extrusion as it leaves the extrusion die in hot condition. The composite strip, of which the P.V.C. layer 3 and the under surfaces of the edge zones 5 may be softened, for example by hot air jets adjacent the place where it is applied to the extrusion, may be pressed against the extrusion by rollers to heat-weld it to the extrusion.

Figure 3:
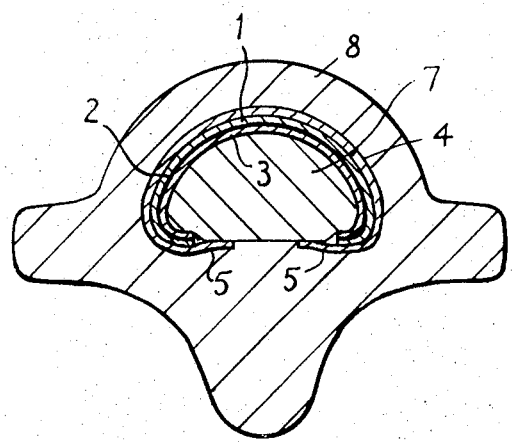

In another embodiment, the composite metallised strip according to this invention may be used with advantage in a decorative extrusion made according to the invention of Specification No. 1,056,697. This is diagrammatically illustrated in FIG. 3. The composite strip is bonded to the extruded plastics core 7, the marginal zones 5 of the outer P.V.C. film also being directly bonded to core. The core with the composite strip bonded thereto is incorporated as an insert in an extrusion 8 of transparent or translucent P.V.C. The employment of the composite strip has the further advantage that the P.V.C. extrusion 8 is compatible with and bonds to the outer P.V.C. film 4, which further assists in reducing crinkling.

In another embodiment the protruding marginal zones of the outer P.V.C. film may be folded around and bonded to the P.V.C. layer 3, and in this form the strip may be bonded to the surface of an extrusion or embedded therein as above described.

While particular embodiments have been described, it will be understood that various modifications may be made without departing from the scope of the invention. For example, a modified decorative effect can be obtained by applying paint or the like to selected parts of that surface of the outer P.V.C. film 4 which is laminated to the surface of the polyester film. Thus one or more longitudinal bands of an opaque or translucent paint may be applied along the said surface of the film 4 to overlie the metallisation seen from the front face of the composite strip.

I claim:

1. A decorative plastic strip comprising a plastic extrusion having bonded thereto a metallized strip comprising a strip of transparent or translucent polyester film having one surface metallized and having its metallized surface laminated to a thin backing layer of polyvinyl chloride, and a second strp of transparent or translucent polyvinyl chloride film, which is wider than the polyester strip, laminated to the unmetallized surface of the polyester film with its marginal edge zones protruding beyond the edges of the polyester strip, said backing layer being heat-sealed to the surface of the extrusion, said second strip overlying the polyester strip, the rear surfaces of said protruding marginal edge zones being heat sealed to the extrusion and sealing the longitudinal edges of the metallized layer.

2. A decorative plastic strip comprising a plastic extrusion having bonded thereto a metallized strip comprising a strip of transparent or translucent polyester film having one surface metallized and having its metallized surface laminated to a thin backing layer of polyvinyl chloride, and a second strip of transparent or translucent polyvinyl chloride film, which is wider than the polyester strip, the protruding marginal edge zones of said second polyvinyl chloride film being folded around the edges of the polyester strip and the rear surface of said protruding marginal edge zones being heat sealed to the outer surfaces of said backing layer, said backing layer and the outer surface of said protruding marginal edge zones being heat sealed to the extrusion.

3. A decorative plastic strip according to claim 1 including a decorative coating applied to at least one selected area of said second strip of polyvinyl chloride film.

4. A decorative plastic strip according to claim 2 including a decorative coating applied to at least one selected area of said second strip of polyvinyl chloride film.

5. A decorative metallized strip comprising a strip of transparent or translucent polyester film having one surface metallized and having its metallized surface laminated to a thin backing layer of polyvinyl chloride, and a second strip of transparent or translucent polyvinyl chloride film, which is wider than the polyester strip, laminated to the unmetallized surface of the polyester film with its marginal edge zones protruding beyond the edges of the polyester strip, said protruding marginal edge zones of said second polyvinyl chloride film being folded around the edges of the polyester strip and heat sealed to said backing layer, the rear surface of said protruding marginal edge zones being bonded to the outer surface of said backing layer.

References Cited

UNITED STATES PATENTS

| | | | |
|---|---|---|---|
| 2,197,181 | 4/1940 | Katz | 161—104 |
| 2,203,822 | 6/1940 | Hyman | 161—99 |
| 2,852,423 | 9/1958 | Bassett | 161—104 |
| 3,013,919 | 12/1961 | Bialy | 161—214 |
| 3,046,174 | 7/1962 | Brooks et al. | 161—214 |
| 3,308,004 | 3/1967 | Rouault | 161—214 |
| 3,436,297 | 4/1969 | Brooks et al. | 161—119 |

FOREIGN PATENTS

| | | |
|---|---|---|
| 857,814 | 1/1961 | Great Britain. |
| 1,034,643 | 6/1966 | Great Britain. |
| 1,056,697 | 1/1967 | Great Britain. |

WILLARD E. HOAG, Primary Examiner

U.S. Cl. X.R.

161—99, 102, 103, 104, 214, 218, 231, 254, 256; 293—DIG 4, 62